US012709027B2

(12) United States Patent
Whitear

(10) Patent No.: US 12,709,027 B2
(45) Date of Patent: Aug. 18, 2026

(54) GRIPPER AND GRIPPING ASSEMBLY

(71) Applicant: MILLITEC FOOD SYSTEMS LIMITED, Derbyshire (GB)

(72) Inventor: Daniel Mark Whitear, Derbyshire (GB)

(73) Assignee: MILLITEC FOOD SYSTEMS LIMITED, Derbyshire (GB)

( * ) Notice: Subject to any disclaimer, the term of this patent is extended or adjusted under 35 U.S.C. 154(b) by 1055 days.

(21) Appl. No.: 17/755,453

(22) PCT Filed: Oct. 30, 2020

(86) PCT No.: PCT/GB2020/052743

§ 371 (c)(1), (2) Date: Apr. 29, 2022

(87) PCT Pub. No.: WO2021/084263

PCT Pub. Date: May 6, 2021

(65) Prior Publication Data

US 2022/0371210 A1 Nov. 24, 2022

(30) Foreign Application Priority Data

Oct. 30, 2019 (GB) ..................................... 1915772

(51) Int. Cl.
*B25J 15/12* (2006.01)
*B25J 11/00* (2006.01)
(Continued)

(52) U.S. Cl.
CPC ......... *B25J 15/106* (2013.01); *B25J 11/0045* (2013.01); *B25J 15/022* (2013.01); *B25J 15/12* (2013.01)

(58) Field of Classification Search
CPC ...... B25J 15/12; B25J 11/0045; B25J 15/024; B25J 15/022
See application file for complete search history.

(56) References Cited

U.S. PATENT DOCUMENTS 11,584,022 B2 * 2/2023 Duhamel ............... B25J 15/022
2010/0181792 A1 7/2010 Birglen et al.
(Continued)

FOREIGN PATENT DOCUMENTS

CN 107322625 A 11/2017
CN 109807920 A 5/2019
(Continued)

OTHER PUBLICATIONS

International Search Report for International Patent Application No. PCT/GB2020/0502743 (mailed Apr. 28, 2021).
(Continued)

*Primary Examiner* — Bradley Duckworth
(74) *Attorney, Agent, or Firm* — Joseph M. Noto; Bond Schoeneck & King, PLLC

(57) ABSTRACT

The present invention relates to a gripper assembly for gripping a product. The assembly comprises first and second mounting members; an actuator for causing relative movement between the first and second mounting members; and a plurality of gripper members spaced apart about a primary axis. At least one the gripper members comprise a resiliently deformable body comprising a distal end and first and second connection formations spaced from the distal end and from each other, the first and second connection formations being connected to the first and second mounting members respectively such that an axial component of movement between the first and second mounting members caused by the actuator in use imparts a rotation of the distal end of each gripper member in a direction towards and/or away from the primary axis.

25 Claims, 13 Drawing Sheets

(51) Int. Cl.
*B25J 15/02* (2006.01)
*B25J 15/10* (2006.01)

(56) References Cited

U.S. PATENT DOCUMENTS

| | | | |
|---|---|---|---|
| 2016/0075036 | A1 | 3/2016 | Lessing et al. |
| 2018/0333864 | A1 | 11/2018 | Hara et al. |
| 2019/0168396 | A1 | 6/2019 | Leidenfrost |

FOREIGN PATENT DOCUMENTS

| | | | |
|---|---|---|---|
| DE | 102018203788 | A1 | 9/2019 |
| GB | 2567716 | A | 4/2019 |
| JP | 2009279707 | A | 12/2009 |
| WO | 2016029299 | A1 | 3/2016 |
| WO | 2016/0141266 | A1 | 9/2016 |
| WO | 2016141266 | A1 | 9/2016 |
| WO | 2018013056 | A1 | 1/2018 |
| WO | 2018/0230729 | A1 | 12/2018 |
| WO | 2019017001 | A1 | 1/2019 |
| WO | 2018230729 | A1 | 4/2020 |

OTHER PUBLICATIONS

Search Report for Patent Application No. GB1915772.6 (dated Apr. 27, 2020).

* cited by examiner

GRIPPER AND GRIPPING ASSEMBLY

This application claims the benefit of International Patent Application No. PCT/GB2020/052743, filed Oct. 30, 2020, which claims priority to GB1915772.6, filed Oct. 30, 2019, which are all hereby incorporated by reference in their entirety.

The present invention relates to a gripper and a gripping mechanism, particularly to a gripper or gripping mechanism for a food production environment or other hygienic environment.

INTRODUCTION

In a manufacturing environment, there is often requirement for an end effector to contact or manipulate a product in a variety of ways, for example, to pick up, hold, reorient, compact, cut or otherwise manipulate a product. Where the product is soft, delicate or has high dimensional tolerances e.g. as occurs in many food handling applications, prior art devices have difficultly contacting the product without causing damage thereof. Prior art solutions may require force feedback sensors or the like, which are expensive to produce and difficult to implement.

In a prior art solution disclosed in US 20016/0075036A1, a "soft" or conformal grasper is used. With reference to FIGS. 3A and 3B of US 20016/0075036A1, the device comprises a plurality of hollow resiliently deformable actuators 30, which are akin to inflatable fingers. The actuators 30 have a convoluted/concertina like surface provide an upper side thereof. As air is pumped into the actuators 30, the concertina expands and deforms, thus causing a differential expansion on the upper side of the actuator 30. This causes the actuator 30 to bend in a downward direction. The plurality of actuators 30 come together to provide a gripping effect.

As the gripping effect is provided by the deformable actuator 30 and the compressible air pressure therein, the actuators 30 provide a soft, resilient grip. Therefore, the grasping arrangement is suitable to handle delicate products.

However, the inventor has found that due to the shape of the actuators, bespoke manufacturing techniques are required in the manufacture thereof. For example, the complex, concertina shape requires a specific moulding process. This increases the difficulty and cost of manufacturing the grasper, resulting in sets of actuators that are particularly expensive to replace.

The complex shape means the graspers are difficult to repair and the hollow profile means they are liable to puncture.

Furthermore, there is a limit to the force with which a product can be gripped in certain configurations, i.e. a limit to the force that can be applied radially inwardly by the grasper. For example, part way along the length/height of the individual actuator, the arcuate form that is achievable by the inflated actuators may not be suitable for certain pinching, gripping or consolidating actions.

Additionally, contaminants (e.g. dirt, dust etc.) can become trapped into the folds of the concertina shape, thus requiring careful cleaning. The requirements for cleaning and avoidance of sites for bacterial growth are particularly important for hygienic applications, such as food handling/processing. Machines are disassembled and cleaned regularly and any additional cleaning burden hampers production efficiency.

The present invention aims to overcome or ameliorate one or more of the above problems.

STATEMENTS OF INVENTION

According to a first aspect of the present invention, there is provided a gripper assembly as recited in claim 1.

According to a second aspect there is provided a gripper member as recited in claim 24.

According to a third aspect, there is provided a method of manufacturing a gripper member, comprising: extruding a continuous length of material comprising the cross-section of the gripper; and cutting the continuous extrusion into a plurality of discrete grippers. Alternatively the gripper members may be individually formed by moulding or 3D printing.

There may be provided a food manufacturing line comprising a gripper member or gripper assembly/mechanism according to any of the preceding aspects.

The plurality of gripper members may comprise opposing gripper members of the same type, e.g. each being actuable in a common direction or being actuable towards and/or away from the other. Alternatively one or more of the grippers is static/fixed relative to the other(s). In other embodiments, an opposing gripper member may be of a different type and may not comprise one or more feature of the deformable body. The opposing gripper member could be non-deformable or rigid and/or may not be actuated. A plate or other abutment member could be used to grip the product against.

In some embodiments, the gripper members may comprise an opposing gripping formation. The gripper members may be described as fingers and the opposing gripping formation may be described as a thumb. The opposing gripping formation may be integrally formed with the gripper member. One of the connection formations may be formed with or provided on the opposing gripping formation.

The actuator for actuating the gripper assembly may be a linear and/or pneumatic actuator. A piston may be used as the actuation means.

The actuator may have a hub/carriage housing. One or more pneumatic pathway may be provided within the hub to actuate the pneumatic actuator. The hub housing may be rotatable.

The actuator may comprise a hub and an inner portion. One of the inner portion and the hub may be received within the other of the inner portion and the hub. An at least partially annular cavity may be formed between inner portion and the hub. The cavity may be fluidly connected to the pneumatic actuator and a pneumatic line in use.

A seal may be provided between the inner portion and the hub to divide the cavity into fluidly disconnected portions, e.g. such that each of the respective cavity portions is connected between: a portion of the pneumatic actuator configured to provide a forward and a return stroke; and a respective pneumatic line in use. The forward and return strokes may be actuated using each of a plurality of the respective pneumatic lines in use.

The gripping assembly may be connected to an end effector carriage. The end effector carriage may comprise a fluid pressure line within the housing configured to provide fluid pressure actuation of the gripping assembly in use.

An output shaft may be operatively located in the force path between the carriage and the gripping assembly in use, the shaft comprising a fluid pathway operatively extending between the fluid pressure line and the gripping assembly in use. The carriage may comprise a rotational actuator for the output shaft. A motor may drive the shaft.

The output shaft may comprise one or more fluid inlet arranged to be range-taking relative to an axis of the shaft such that fluid communication between the fluid pathway and the fluid pressure line is maintained during movement/rotation of the shaft.

One or more inlets may be circumferentially spaced and/or angularly range-taking about the shaft such that fluid communication between the fluid pathway and the fluid pressure line is maintained during rotation of the shaft.

The fluid pressure line within the housing/carriage may comprise a chamber surrounding an inlet of the fluid pathway of the shaft.

The gripper may be manufactured by cutting from a sheet/body of material, e.g. using laser cutting, stamping with a die, or water jet cutting.

The first and/or second connection formations may comprise a hinge, such as a living hinge The gripper body may be configured to be rotated without substantial deformation during relative movement between the first and second connection formation and a majority of deformation may occur in said hinge.

The distal end of the gripper member may comprise an increased width, e.g. being tapered outwardly towards the distal end in a width/lateral direction. The distal end may be shaped to define a beak or spade-like end.

The gripper member may comprise a stiffening or strengthening member, e.g. a resiliently deformable or spring member. The member may be embedded in the gripper member. The member may be over-moulded by the resiliently deformable (e.g. elastomeric) material of the gripper member.

Further preferable features are defined in the dependent claims. Any of the preferable features defined therein may be applied to any aspect of the invention, wherever practicable.

DETAILED DESCRIPTION

Working embodiments of the invention are described in further detail below by way of example only with reference to the accompanying drawings, of which:

Figure 10A:
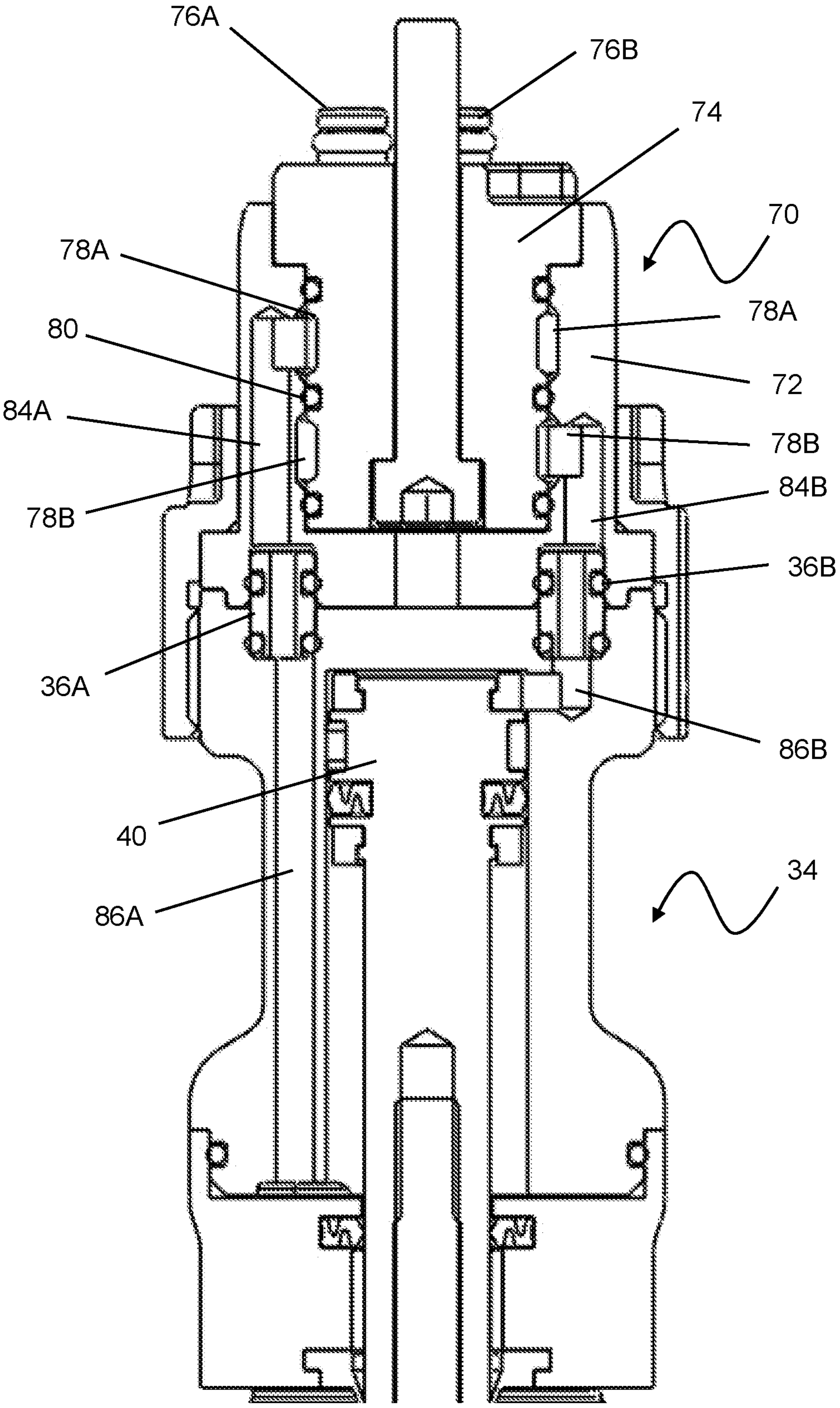
Figure 10B:
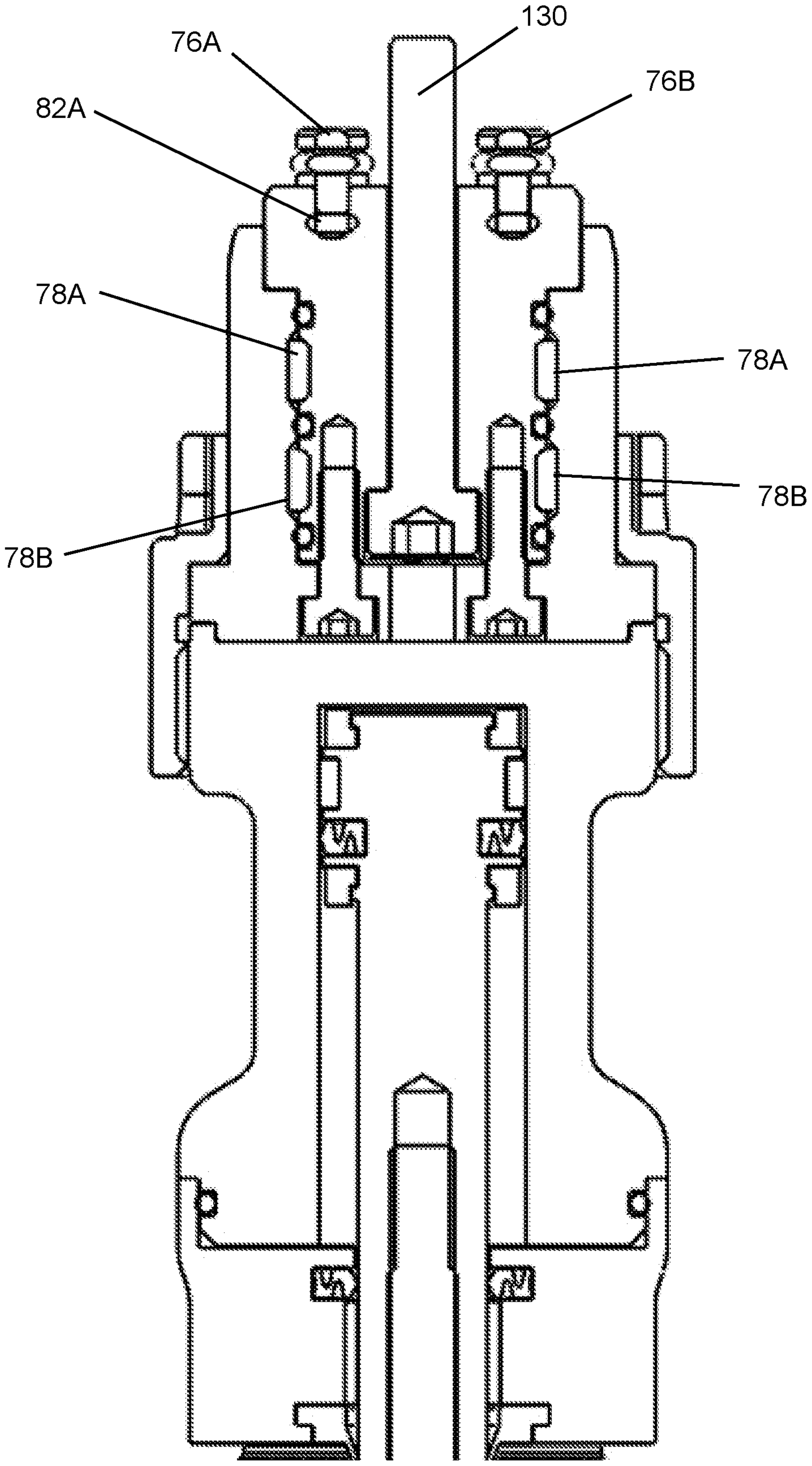
Figure 11:
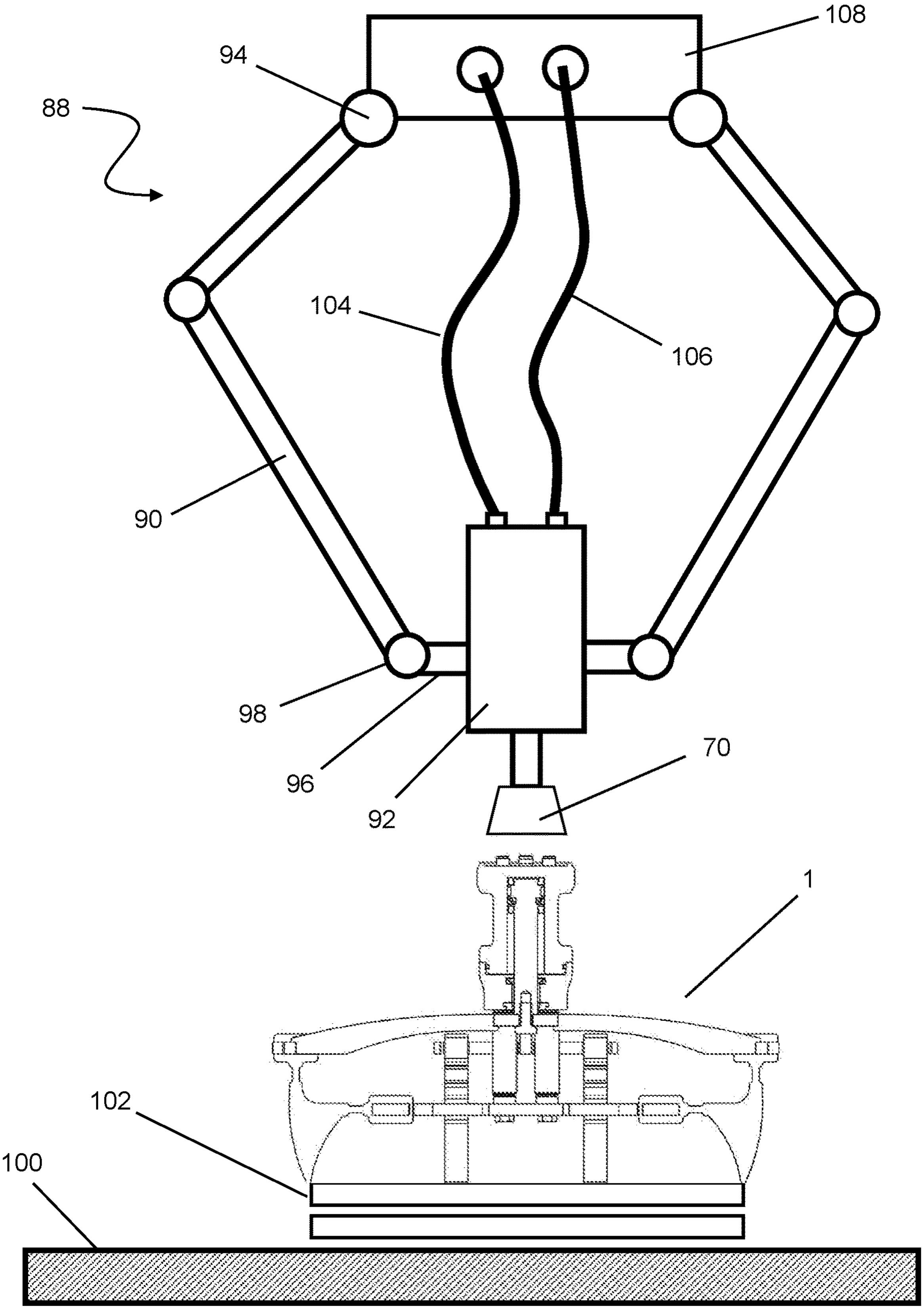
Figure 12:
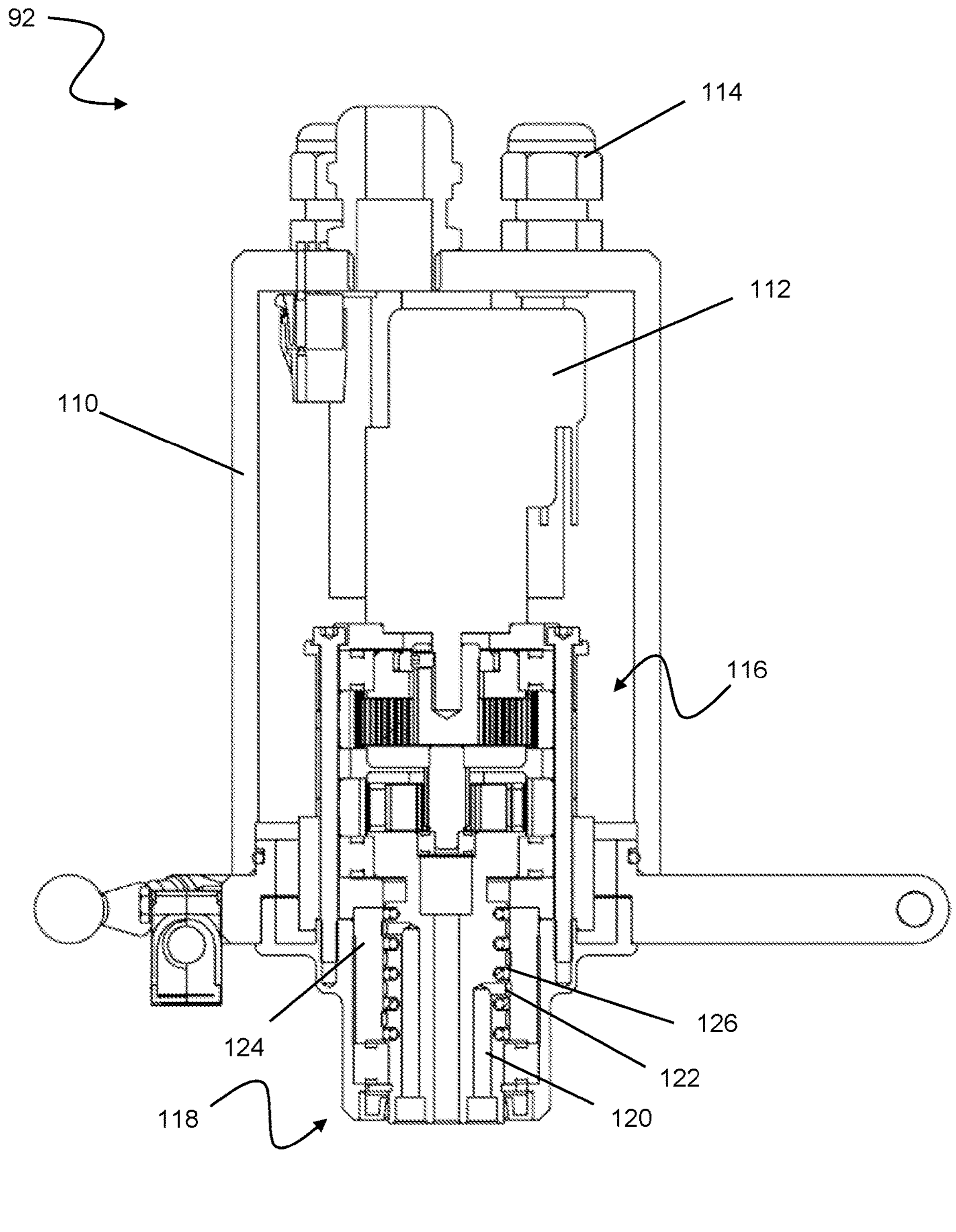
Figure 13:
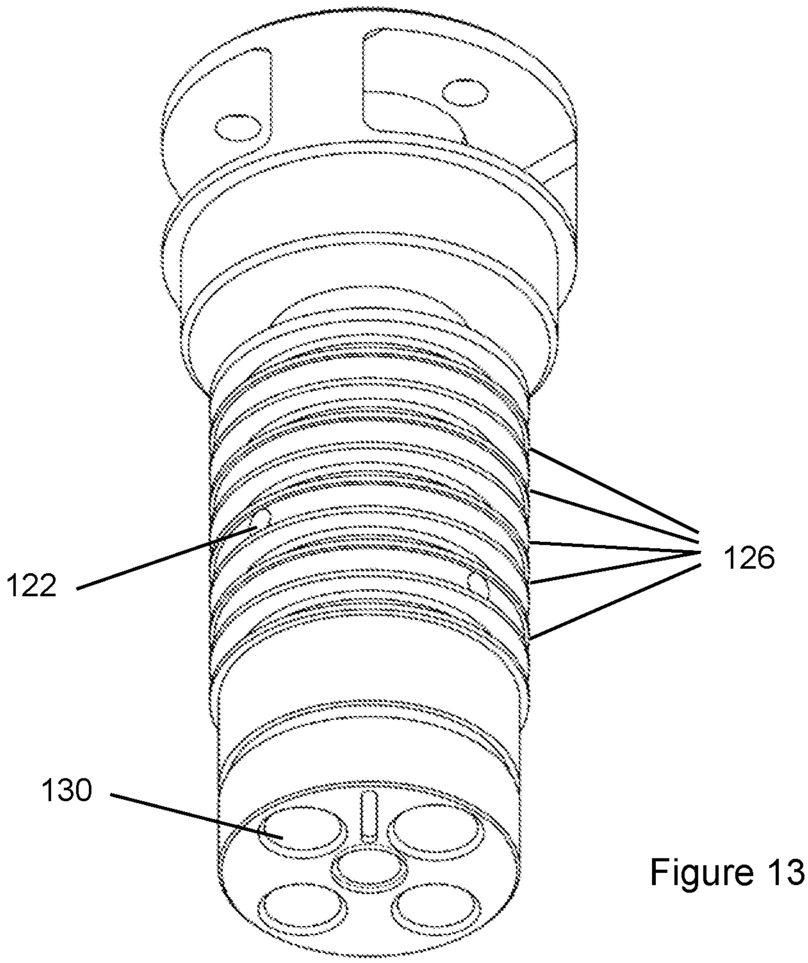
Figure 20A:
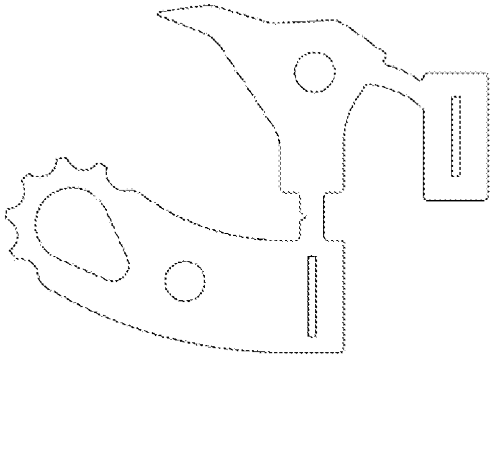
Figure 20B:
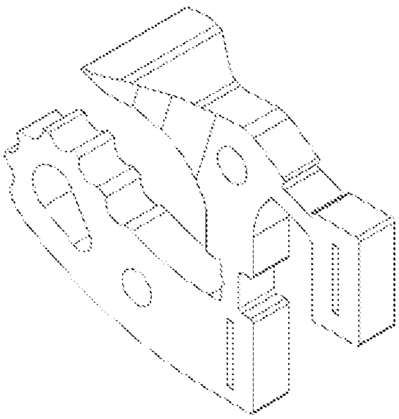

FIGS. 10*a* and 10*b* show a section view through a further example of an actuator for the gripper assembly;

FIG. 11 shows the gripper assembly in combination with a delta robot;

FIG. 12 shows a section view of an end effector carriage for supporting the gripping assembly on the delta robot;

FIG. 13 shows an isometric view of a connector shaft of the carriage;

FIGS. 14 to 19 show plan views of a gripper member in different states of actuation;

FIGS. 20A and 20B show respective plan and isometric views of a further embodiment of the gripper member.

FIGS. 1-10 show a gripping assembly or mechanism 1 (see FIG. 2) for gripping a product. The product may then be moved, rotated, consolidated, inspected or positioned relative to other products or packaging as required when gripped. The gripping mechanism 1 may be used in a manufacturing line, a warehouse, an agricultural or medical environment, or other environments requiring automated picking or holding actions. The gripping mechanism 1 may be used in a food handling, production and/or manufacturing environment. The gripping mechanism may be suitable for other hygienic, e.g. clean room, environments.

Figure 1:
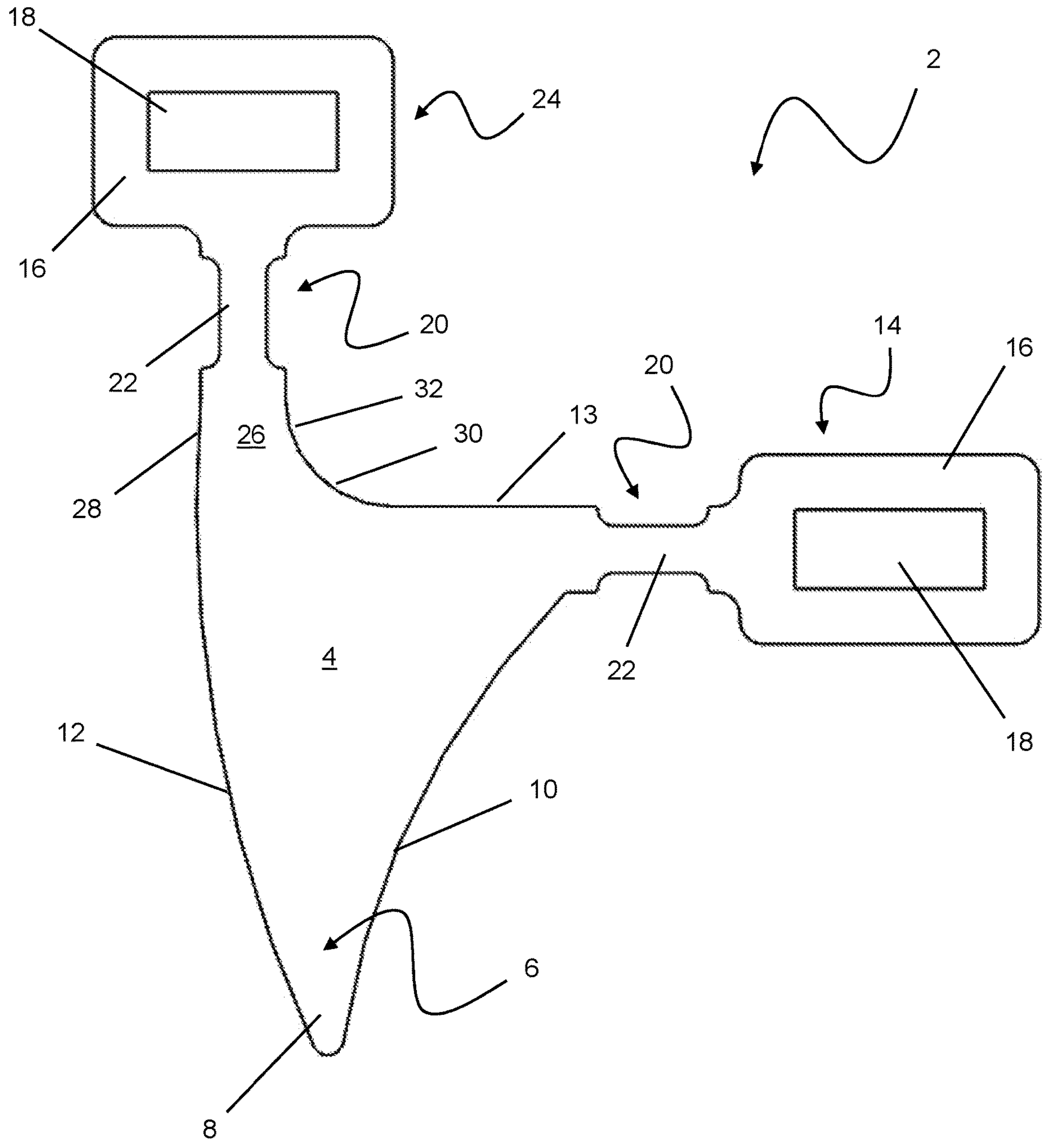
FIG. 1 shows a plan view of a gripper member according to an example of the invention.
Figure 2:
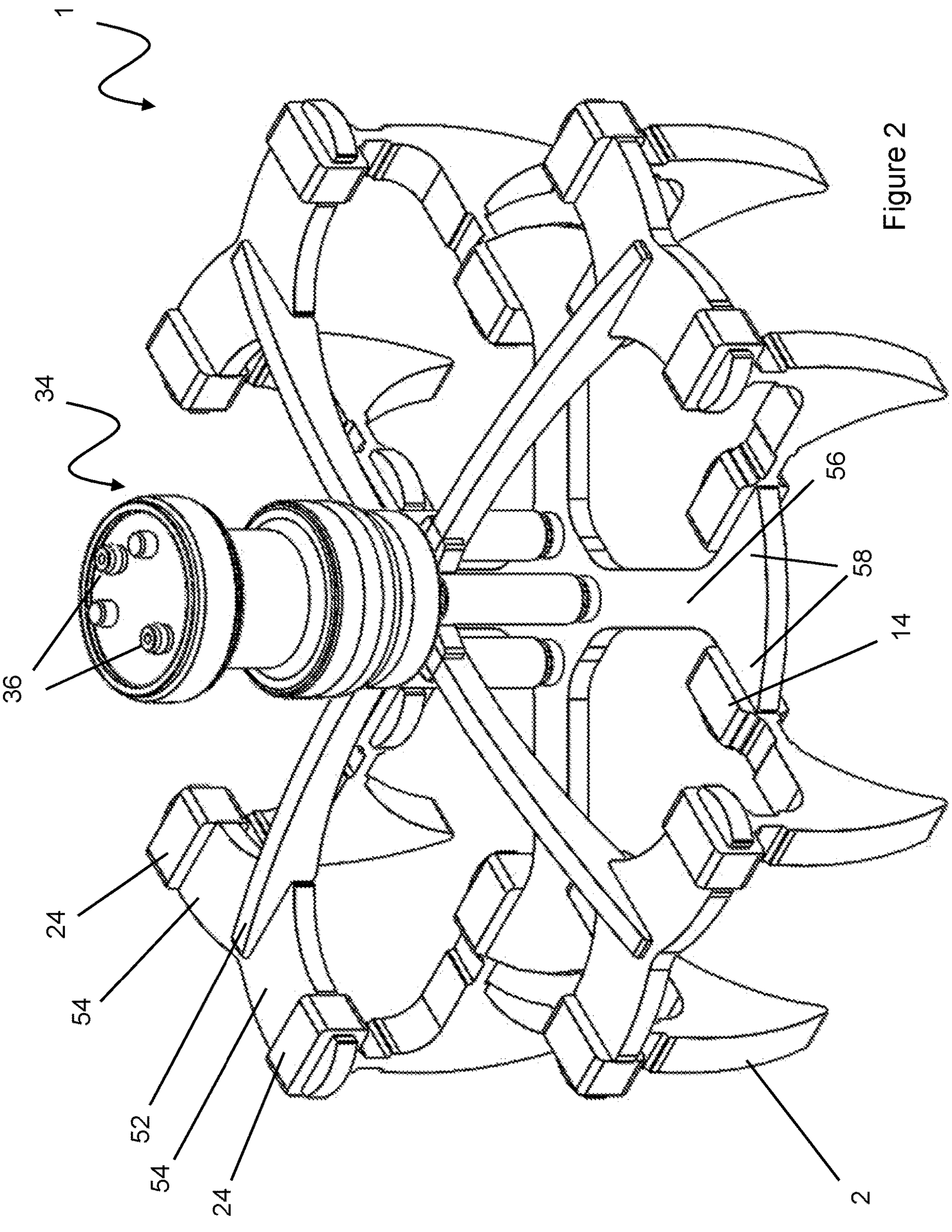
FIG. 2 shows a three-dimensional view from above of a first example of a gripper assembly.

The gripping mechanism 1 comprises one or more gripper 2 configured to engage and grip the product. The gripper 2 is shown in FIG. 1. In this figure the gripper 2 in a relaxed (i.e. unstressed) state. In the relaxed state, the gripper 2 is typically configured to be disengaged from the product.

The gripper 2 comprises a body 4. The body comprises an end 6, referred to herein as a distal end. The end 6 comprises an apex 8 and is configured to engage the product and provide a grip thereof. Additionally or alternatively, a first side 10 of the body 4 may be used to grip the product. The apex 8 and/or the first side 10 may have one of more grip features to enhance to the grip of the product. For example, the grip feature comprises a plurality of ridges/protrusions. The apex 8 in this example is rounded to prevent damage to the product.

The body 4 is substantially triangular. The body 4 therefore has three corners, with one of the corners comprising the apex 8. The body comprises three sides 10, 12, 13. One or more sides of the body 4 is curved/arcuate in form, e.g. such that the apex 8 is tilted toward the first side 10 (i.e. toward the product in use). The first side 10 is curved, e.g. being concave, in this regard. The second side 12 may also be curved, e.g. being convex. The third side 13 is substantially straight.

The body 4 resembles a claw, a tooth or shark fin shape in profile.

A first connection portion 14 is attached to the body 4. The first connection portion 14 is configured to connect the gripper 2 to a mounting member of an actuator in use. The connection portion 14 comprises a retaining portion 16 configured to allow attachment of the first connection portion 14 to the mounting member in use. The retaining portion 16 comprises an aperture 18 configured to receive a corresponding formation on the mounting member. The retaining portion 16 thus comprises a loop. The retaining portion 16 is shaped to prevent rotation of the retaining portion 16 relative to the mounting member of the actuator. The retaining portion 16 and/or aperture 18 are rectangular/square in this example but could otherwise be a different polygonal form. In other embodiments the retaining portion 16 comprises a tang or the like configured to be received in a correspondingly shaped aperture (e.g. an elongate slot) on the actuator.

The first connection portion 14 comprises a hinge formation 20. The hinge 20 extends between the body 4 and the retaining member 16. The hinge 20 comprises a reduced-width (i.e. thin/narrow) portion 22. The portion 22 is narrower than the body 4 so as to form a bridge or neck formation as an interface between the body 4 and connection 14.

The hinge 20 permits relative translation/rotation between body 4 and the retaining member 14, e.g. by flexing in a manner akin to a living hinge. The first connection portion 14 therefore provides a flexible/deformable connection between the body 4 and the mounting member of the actuator (to be described below).

A second connection portion 24 is connected to the body 4. The second connection portion 24 is substantially the same as the first connection portion 14, and will not be described further.

The first and second connection portions are spaced apart at a proximal end/edge of the body 4, e.g. being provided on respective corners of the triangular body 4. The apex 8 therefore provides the third/distal corner of the triangle.

The first and second connection portions extend away from the body 4 in different directions. The first and second connection portions extend away from the body 4 in substantially perpendicular directions. This allows movement of the body 4 in a direction having two orthogonal components (i.e. can move within the plane of the page).

The elongate shape of the respective retaining members 16/apertures 18 in the first and second connection portions is aligned/parallel. in this example the hinge 20 of the first connection member 14 connects to the short side of the retaining member 16 and the hinge 20 of the second connection member 24 connects to the long side of the retaining member 16. However, it can be appreciated that in other embodiments, the elongate axis of the retaining members 16/apertures 18 could extend in different directions, as required.

The body 4 comprises a protruding portion 26 configured to extend between the body 4 and the second connection portion 24. The second connection portion 24 therefore extends further from the body 4 than the first connection portion 14. A first side 28 of the protrusion comprises a continuation of the second side 12. A curved side portion 30 extends between a second side 32 of the protrusion and the third side 13. The protruding portion 26 is thus wider than the hinge 20.

The gripper member 2 comprises, or is formed of, a resiliently deformable (i.e. flexible) material. The gripper 2 may comprise, or be formed of, an elastomeric (e.g. rubber) or polymeric material. The gripper 2 may comprise a high friction surface. This may be provided by the bulk material of the gripper, or the gripper may be fully/partially covered with a high friction portion or coating. The gripper 2 comprises a food/medical safe material (e.g. an FDA or MHRA approved material).

The gripper 2 (i.e. the body 4, connection portions etc) is formed as a single unitary/integral/monolithic piece, e.g. by a moulding process. Flexion of the gripper 2 is therefore provided by resilient deformation of the bulk material of the gripper 2. The body 4 and/or gripper 2 are substantially solid (i.e. are not hollow) in this example, but the body 4 could have a hollow central section to provide a more readily deformable gripper if desired. In some embodiments, the body 4 comprises a plurality of cells/hollows to provide a network of linkages therein, thereby allowing customising of the deformation behaviour of the gripper 2.

The gripper 2 has a uniform (i.e. unchanging) cross section in at least one direction. The direction is substantially parallel with the effective axis of rotation of the gripper 2 (i.e. in a direction in/out of the plane of the page). The gripper 2 may then be manufactured using a single extrusion process, with the length of the extrusion extending along the unchanging direction. A continuous/semi-continuous extrusion is therefore created. The extrusion may then be cut into a plurality of discrete grippers portions.

The portions may be the same length to produce a plurality of gripper members of standard/uniform depth. Alternatively, the extrusion may be cut at different length spacing to allow gripper members of different depth, e.g. having different resilience and/or strength properties. This may provide a particularly cost-effective way of producing soft/compliant gripper members that can be tailored to different needs.

In other examples, the individual gripper members could be formed individually by a different moulding process, such as injection moulding. In other examples, the grippers may be manufactured by cutting from a sheet material, for example, using laser cutting, stamping, or water jet cutting.

The grippers 2 may be shaped to conform to the shape of the product or a portion thereof. The level of engagement between the gripper 2 and the product may therefore be tailored according to use.

FIGS. 2-5 shows a plurality of grippers 2 mounted on gripping mechanism 1, i.e. as a modular gripper assembly.

The gripping mechanism 1 comprises a hub portion 34. The hub 34 is configured to provide attachment to a further actuator or station. For example, the hub may be attached to a robotic armature, a station of a production line (i.e. in a fixed position), or other fixed/mobile actuators. It is envisaged that the gripping mechanism would provide an end effector of a robotic armature, such as a singular jointed arm (e.g. six axis robot) or a delta robot armature. However stations with reduced freedom of movement may be suitable for simpler picking operations.

Figure 3:
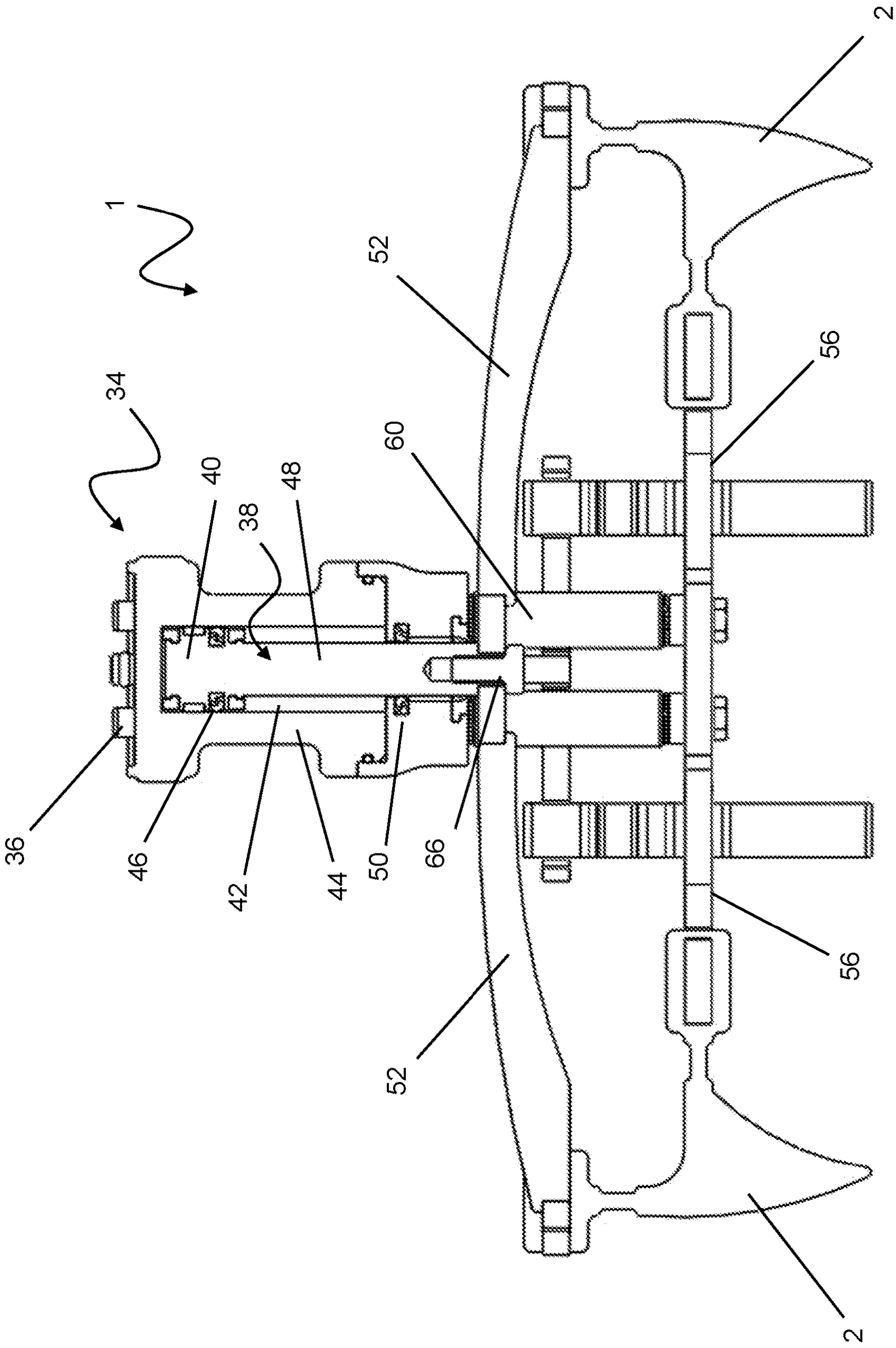
FIG. 3 shows a sectional view through the gripper assembly of FIG. 2.

The hub 34 comprises a plurality of connectors 36 configured to be connected to a pneumatic line in use. The pneumatic line provides pneumatic power to actuate the grippers 2 between an engaged position and a disengaged position. With reference to FIG. 3, a pneumatic actuator 38 is provided within the hub 34.

The pneumatic actuator comprises a piston 40 movably received within a chamber 42 defined by the wall(s) 44 of the hub 34. The piston 40 sealingly engages the internal surface of the wall 44. A seal 46 (e.g. a gasket or the like) is provided between the piston 40 and the wall 44 to provide a seal therebetween. A first side of the piston 40 is fluidly connected to one of the pneumatic connectors 36 and a second side of the piston 40 is fluidly connected to the other of the fluid connectors. Pneumatic power applied to one of the connectors drives the piston 40 in a first direction and pneumatic power applied to the other of the connectors drives the piston 40 in a second direction. Pneumatic power therefore provides a reciprocating movement of the piston 40. However, in other examples a uni-directional pneumatic drive could be provided, and the mechanism could be biased in a return direction, e.g. by a mechanical spring, gas spring, or similar, or the resilience of the grippers 2 when the applied pneumatic pressure is removed.

The piston 40 comprises a shaft 48. The shaft 48 is configured to at least partially protrude from the hub 34. The shaft 48 is sealed against the hub 34 via a seal 50. In other embodiments, the actuator 38 comprises a different linear actuator. For example, the actuator 38 may comprise an electrical (e.g. a solenoid) or a hydraulic actuator. A pneumatic/linear actuator is in many ways preferred for ease of housing/sealing from the external environment, thereby making the actuator suitable for hygienic/food handling applications.

A plurality of first arms 52 extend outwardly from the hub 34. The first arms 52 comprise a plurality of connectors 54 configured to connect to the second connection portion 24. The connectors 54 extend away each side of the respective arm 52 in a lateral direction (e.g. to provide a T-shaped arrangement). The connectors 54 can therefore engage a respective gripper 2. The arms 52 and associated connectors 54 thus provide first mounting members for the grippers.

A second plurality of arms 56 extend outwardly from the hub 34. The second arm 56 comprises a plurality of connectors 58 configured to connect to the first connection portion 14. The connectors 58 extend away each side of the respective arm 56 in a lateral direction (e.g. to provide a T-shaped arrangement). The connectors 58 can engage a respective gripper 2. The arms 56 and associated connectors 58 thus provide second mounting members for the grippers.

The second arms 56 are provided as a unitary piece (i.e. an X-shaped piece).

Each gripper 2 extends between a respective first arm 52 and second arm 56, e.g. being held by both the first and second mounting members.

The ends of the connectors 54, 58 can be inserted into the apertures 18 in the retaining portions 14, 24 of the grippers 2. Therefore, the grippers 2 can easily be attached or removed by simply sliding the gripper 2 onto the connectors 54, 58. A lip or protrusion retains the retaining portion 14, 24 on the connectors 54, 58 (e.g. at an end thereof). In some embodiments, the grippers 2 may be held onto the connectors 54, 56 by friction and/or the resilient bias of the material thereof (i.e. elastically held in place).

The first arms 52 are operatively connected to the piston 40. Therefore, movement of the first arms 52 is effected by pneumatic actuation of the gripping mechanism 1, e.g. such that the first arms 52 move in unison. The second arms 56 are provided in a fixed position relative to the hub 34. The first arms 52 are therefore movable relative to the second arms 56 and the hub 34. The second arm 56 may be fixed to the hub 34 using a plurality of connectors 60, (e.g. rigid spacer members) extending between the hub 34 and the second arms 56. The connectors 60 are releasably connected to the first arms 52 via a fastener or the like, to permit convenient disassembly.

In the present embodiment, the first arms 52 are provided in a movable arrangement, whilst the second arms 56 are in a fixed arrangement. However, it can be appreciated that in other embodiments, the second arms 56 are movable and the first arms 52 remain fixed. In further embodiments, the first and second arms are both movable relative to one another.

The first arms 52 and the second arms 56 are offset in a lateral, angular and/or circumferential direction. The first arms 52 are located in a position between the second arms 56 when the first and second arms are axially aligned (see FIG. 6). This prevents contact between the first and second arms during actuation of the device. Additionally, each gripper 2 is connected to different sides of the first and second arms. This reduces the chance of accidental removal of the gripper 2, as movement thereof is restricted by the first and second arm in each respective/opposing direction.

The first and second arms extend in a radial direction (e.g. providing a spider-like arrangement). The first and second arms (i.e. the connectors 54, 56 thereof) are radially offset. The first arms 52 extend radially outwardly to a greater extent from a common/central axis than the second arms 56. Alternatively, the connectors 54 could be radially inside the connector 56 if desired.

The grippers 2 are arranged on the arms such that they face an inward direction (i.e. such that the apex 8 and/or side 10 faces inwards during actuation). The apex 8 therefore faces the product in use. In the present embodiment, four first and second arms are provided, thus providing connection to eight grippers 2. The arms are arranged such that grippers 2 are configured in a four-sided arrangement (i.e. the pair of grippers 2 on each respective arm are configured to grip a respective side of a rectangular product from four sides thereof). The present embodiment may therefore be used to pick-up or hold sandwiches.

In other embodiments, the grippers 2 are arranged to engage other shaped products, for example, circular, triangular or elongate shaped products. For example, the hub 34 may be laterally elongate, with grippers arranged on opposing sides thereof. Such a configuration would allow gripping of an elongate product, such as a baguette or similar.

In a simple example, only two opposing grippers 4 may be used, e.g. on opposing sides of a central axis. Thus the mounting members could be simple two-dimensional T-shaped members. However in many examples three or more grippers will be needed in order to grip products from different directions about the central axis. For some examples, it may be beneficial to have a plurality of the grippers mounted/actuated in parallel, e.g. rotating about a common axis when actuated. As shown by the example in FIG. 4, eight grippers are provided in four pairs, with each pair being mounted and actuated in parallel.

In some embodiments, one or more grippers 2 may be provided in an operatively opposing position to a static gripper or other member (i.e. non-movable/fixed with respect to the assembly 1), such the product is gripped between the static gripper/member and the gripper(s) 2 in use. The static portion may comprise a plate, abutment or the like. The static portion may be shaped to conform to the shape of the product. Such an arrangement may be used where space is limited or where alignment of the product is required.

Figure 4:
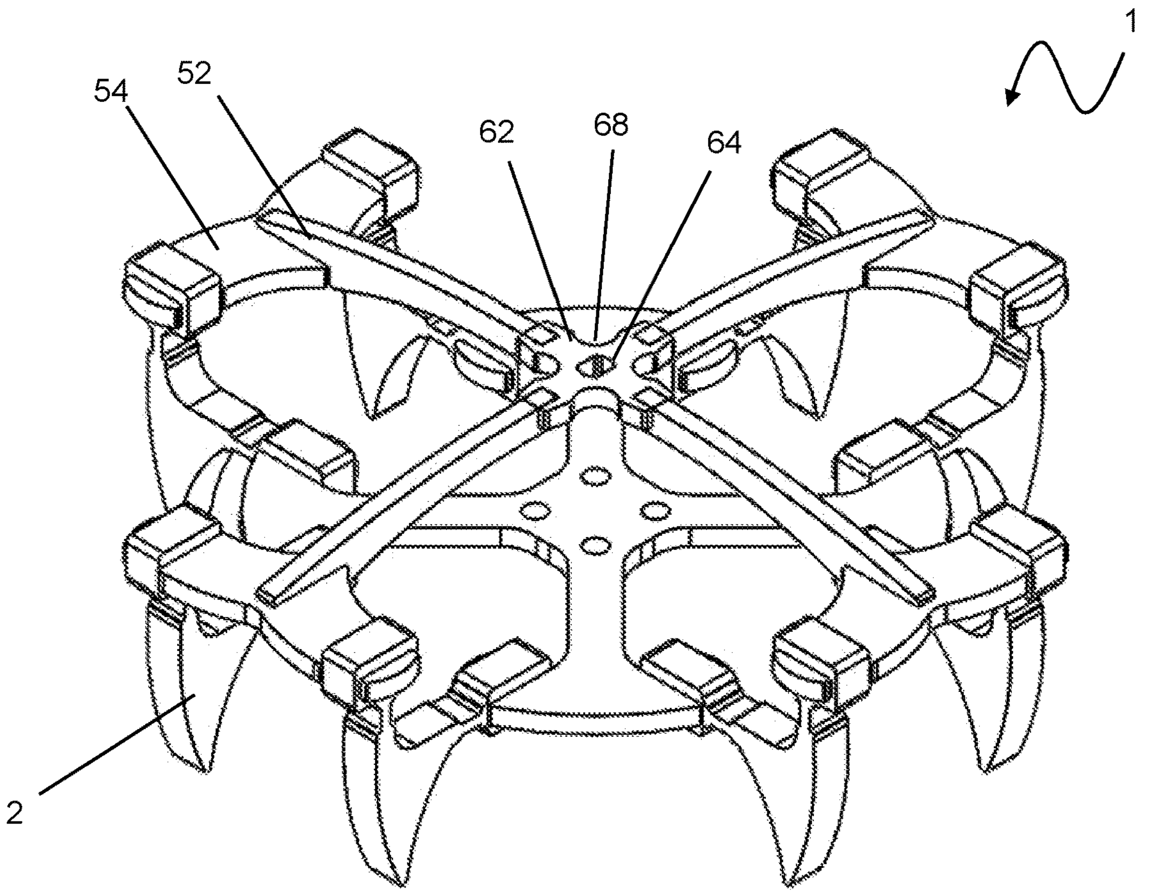
FIG. 4 shows a three-dimensional view from above of the gripper mechanism of FIG. 2 with the actuator removed.
Figure 5:
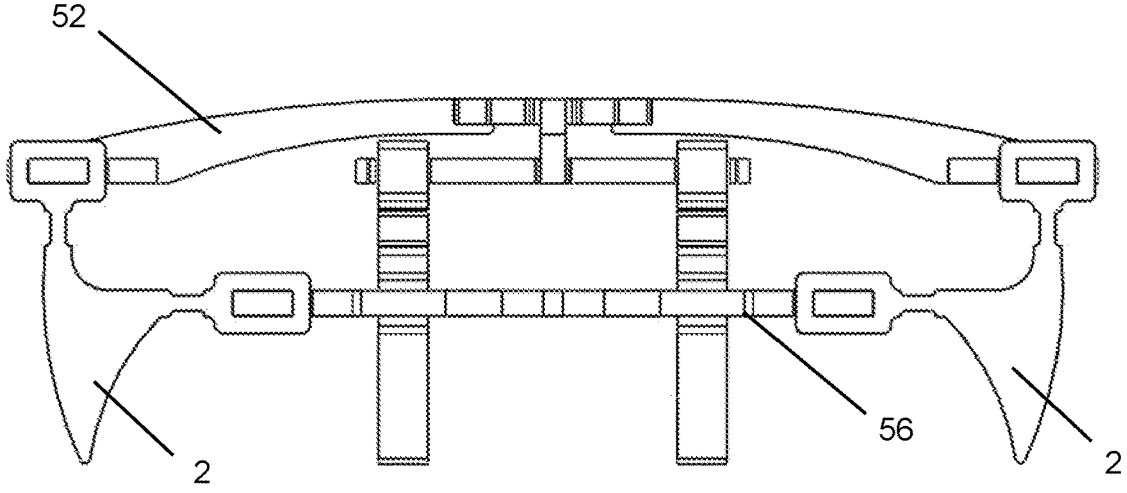
FIG. 5 shows a side view of the gripper mechanism of FIG. 4.
Figure 6:
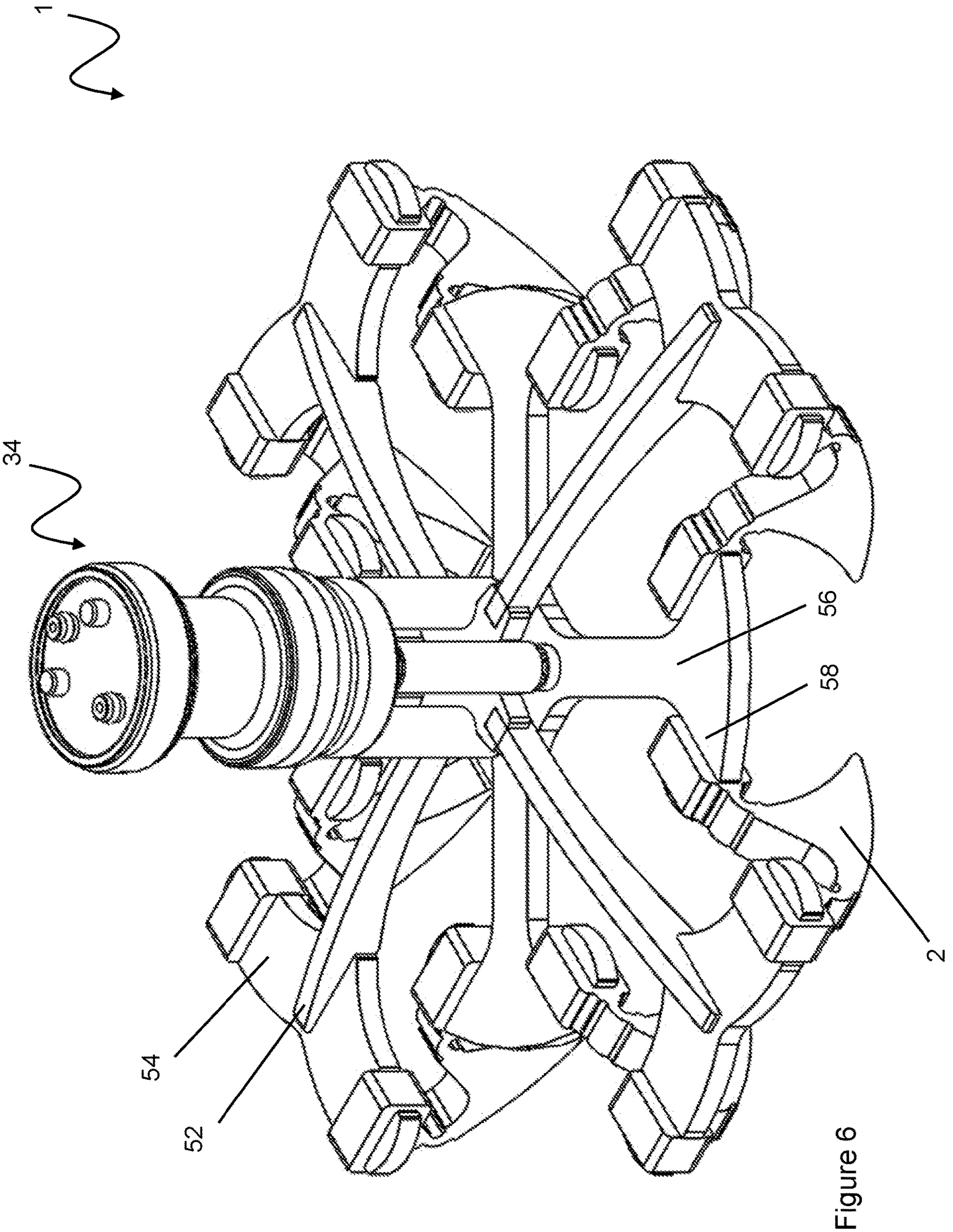
FIG. 6 shows a three-dimensional view of the gripper assembly in an actuated state.
Figure 7:
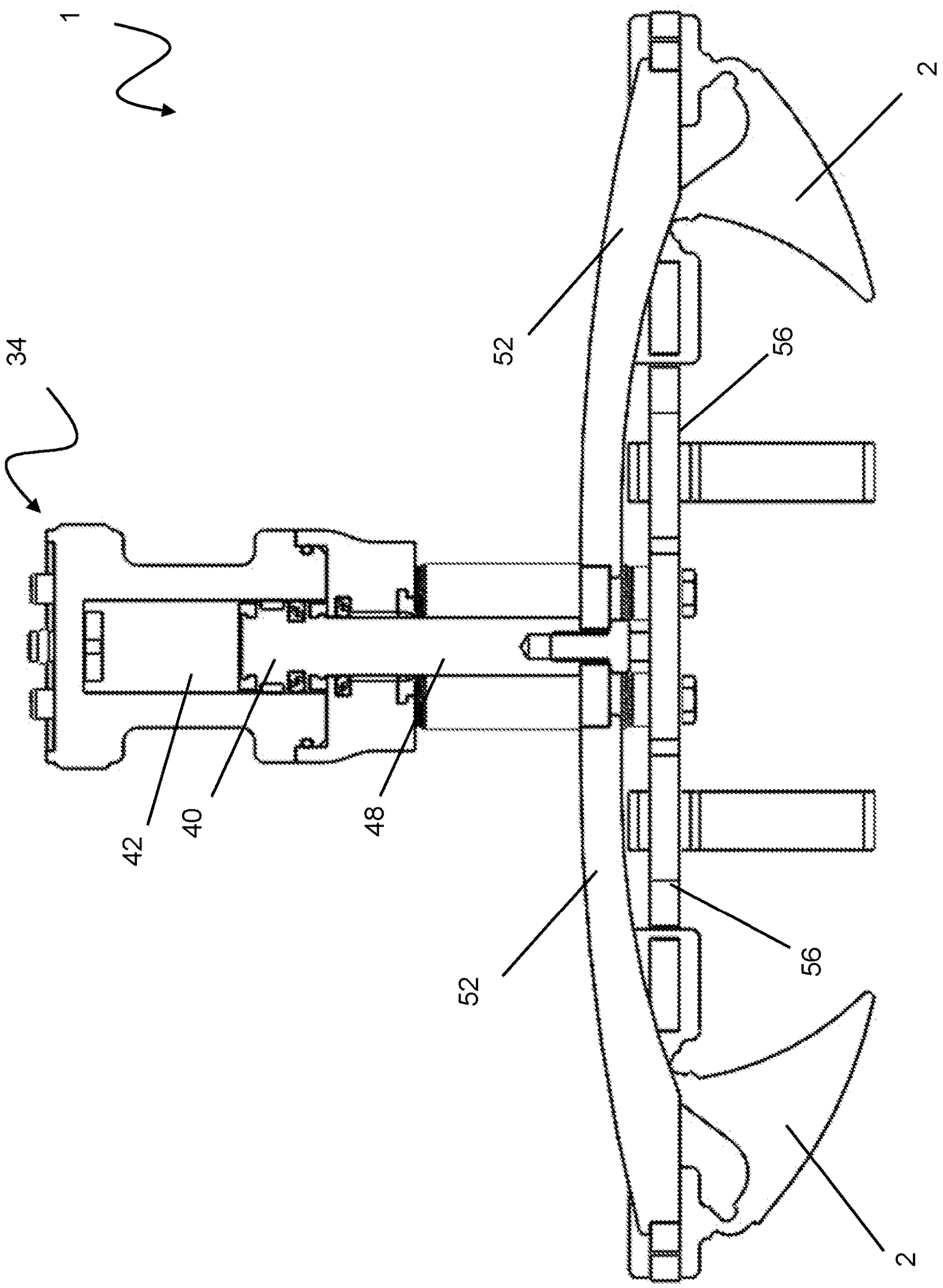
FIG. 7 shows a sectional view through the gripper assembly in an actuated state.
Figure 8:
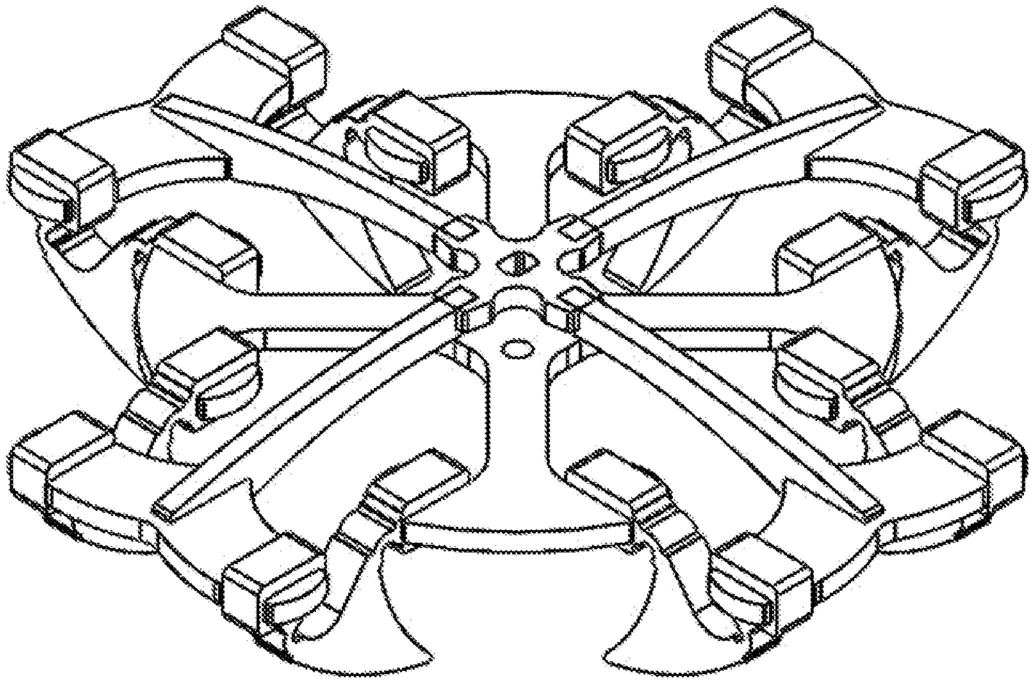
FIG. 8 shows a three-dimensional view from above of the gripper mechanism in an actuated state with the actuator removed.
Figure 9:
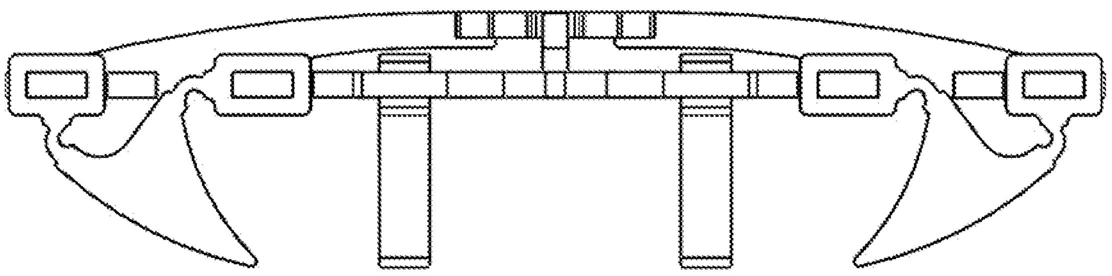
FIG. 9 shows a side view of the gripper mechanism of FIG. 8.

Shown most clearly in FIG. 4, the first arms 52 joined via a hub portion 62. The hub portion 62 is configured to be connected to the piston. The hub portion 62 comprises an aperture 64 therein configured to receive a fastener 66 (see FIG. 3) to permit releasable connection to the piston 40. The hub portion 62 comprises a plurality of grooves 68 configured to engage the connectors 60 extending between the hub 34 and the second arms 56. The hub portion 62 therefore slides along the connectors 60 during actuation.

The connectors 60 support the first arms 52 and prevent lateral movement thereof. The first arms 52 may be detachable from the hub portion 62. In other embodiments, the first arms 52 are permanently fixed to the hub portion 62, e.g. by welding.

In other embodiments, the connection between the hub 34 and the grippers 2 is provided by a plate or ring or the like. Alternatively, the first and/or second connector portions 14, 24 are connected directly to the hub 34 and/or the pneumatic actuator 38.

During the disengaged state shown in FIGS. 2-5, the first and seconds arms are axially offset/spaced. The grippers 2 are therefore in a position with the apex 8 in a laterally outermost position. As the gripping mechanism 1 is actuated, pneumatic power is applied to the chamber 42 on the first side of the piston 40. This drives the piston 40 and the shaft 48 toward the second arms 56. The first arms 52 are therefore axially moved closer to the second arms 56. This induces a rotation in the grippers 2, thus rotating the apex 8 laterally inward and into engagement with the product. Each of the respective grippers 2 is actuated simultaneously.

In the engaged position, the connectors 54 on the first arms 52 and the connectors 58 on the second arm 56 are substantially aligned in an axial direction as shown in FIG.

7. The first and second connection portions 14, 24 are therefore axially aligned. However, it can be appreciated the relative movement between the first and second arms may be provided as little or as much as is required to grip the desired product.

A second embodiment of the invention is shown in FIG. 10. The second embodiment is substantially the same as the first embodiment, however, a connection member 70 is connected to the hub 34. The connection member 70 comprises a housing portion 72. Mounted within the housing portion 72 is an inner portion 74 rigidly connected to the hub 34 (i.e. it cannot rotate with respect to hub 34). The inner portion 74 is configured to attach to the external actuator (e.g. a robotic armature, such as a delta robot).

The connection member 70 comprises a plurality of connectors 76 configured to connect to external pneumatic lines in use. A cavity 78 is provided between the inner portion 74 and the housing portion 72. A seal 80 extends between the housing portion 72 and the inner portion 74 to provide a seal therebetween. The seal 80 thus divides the cavity 78 into two fluidly disconnected cavities 78A and 78B. The connectors 76 on the rotatable connection member 70 and the connectors 36 on the hub 34 are connected to respective cavities 78A, 78B. For example, cavity 78A is connected to connector 76A via passage 82A and to connector 36A on the hub 34 via passage 84A (see FIG. 10B). Therefore, the connectors 76 are fluidly connected to the respective connectors 36 on the hub 34.

Also shown in FIG. 10*a*, the connectors 36 on the hub 34 are connected to the piston chamber 42 via respective passages 86. The first connector 36A is connected to the underside of piston 40 (i.e. to provide the return stroke) via passage 86A. The second connector 36B is connected to the topside of piston 40 (i.e. to provide the forward stroke) via passage 86B.

As shown in FIG. 11, the gripping assembly 1 can be operatively attached to a robotic armature, such as delta robot 88, for use. The delta robot 88 comprises a plurality of articulated limbs 90 supporting an end effector carriage 92 at a lower end thereof. The end effector carriage 92 is configured to support the gripping assembly 1. The limbs 90 are configured to pivot using motors 94 in order to translate the end effector carriage 92 in a horizontal and/or vertical direction.

The end effector carriage 92 is connected to the limbs 90 using a plurality of intermediate connectors 96, e.g. short/rigid arms. The arms 96 comprise a pivotable joint 98, for example, a ball and socket joint, to allow relative rotation between the end effector carriage 92 and the limbs 90. For the sake of clarity, two limbs 90 are shown, however, it can be appreciated delta robots typically comprises three or more limbs 90. It is known that each limb 90 may comprise two parallel arms.

The delta robot 80 is positioned above/adjacent a moving conveyor 100, such as a conveyor belt system, e.g. so that the gripping assembly 1 can pick-up and/or manipulate a product 102 passing beneath the delta robot on the conveyor 100. In other examples the delta robot could be positioned above a stationary platform or a different type of conveyor. The delta robot could be used to transfer items to/from a platform or conveyor, e.g. into packaging or containers or the like.

The delta robot 88, e.g. its base and arms, may otherwise be conventional and will not be described further.

In other embodiments, the end effector is supported by another robotic device, for example, a robotic arm, or a linear actuator.

The end effector carriage 92 comprises an external pneumatic line 104 to provide pneumatic pressure to the gripping assembly 1. The pneumatic line may comprise a plurality of discrete pneumatic lines (i.e. a plurality of separate fluid pathways). The carriage 92 comprises an external power line 106 to provide electrical power to the end effector carriage 92. The pneumatic/electrical lines 104, 106 may be attached to a base unit 108, or may be attached to a pneumatic/electrical source external to the system.

FIG. 12 shows a close up view of an example of the end effector carriage 92. The carriage 92 comprises a housing 110. The housing 110 surrounds the internal components of the carriage (i.e. for actuating/controlling/powering the end effector) and provides a substantially hermetic barrier between the internal environment and the external environment of the carriage 92. The housing 110 provides a sanitary barrier and prevents the ingress of, for example, dust or foodstuffs into the carriage 92.

The carriage 92 may comprises an electric motor 112 disposed within the housing to provide rotational movement of the end effector 2 relative to the housing 110. Alternatively, rotational movement is provided externally to the end effector carriage 92 and is transmitted to the carriage 92 (e.g. via a transmission shaft). The rotational movement is provided about a longitudinal axis of the carriage 92 and/or gripping assembly 1 (i.e. such that the plane of rotation is substantially parallel to the conveyor 100 in use and/or the axis of rotation is substantially perpendicular thereto). The rotational movement of the picker provides rotational movement of the product 102, i.e. to reorient the product 102 when held by the gripping assembly 1. The rotation may be used, for example, to align the product 102 with a package or to reorient the product 102 with respect to one or more further item on the conveyor.

The carriage 92 comprises a plurality of connectors 114 configured to connect to a respective pneumatic line 104. The connectors 114 are operatively connected to a plurality of pneumatic lines/pathways within the housing 110, generally designated as 116. The pneumatic pathways 116 provide a fluid pathway from the pneumatic line 104 through the housing interior to provide pneumatic power for actuation of the gripping assembly. The pneumatic pathways 116 pass within an internal cavity alongside the motor 112, i.e. bypassing the motor which is sealed within a separate internal compartment of the housing 110.

The end effector carriage 92 and/or the gripping assembly 1 comprises a shaft 118 operatively located in the force path between the electric motor 112/transmission shaft and the gripping assembly 1 in use. The shaft 118 comprises a plurality of channels 120 extending therethrough to provide a fluid pathway between the pneumatic pathways 116 and the gripping assembly 1 in use. Each of the channels 120 comprises at least one inlet 122. A plurality of annular chambers 124 within the housing surround a respective inlet 122, thereby permitting transfer of pneumatic fluid from the housing to the shaft, whilst rotation of the shaft is effected.

The length of channels 120 between the inlet 122 and the end of shaft 118 varies between the discrete pneumatic pathways 116. For example, a first pneumatic pathway has a channel 120 of first length, a second pneumatic pathway has a channel 120 of a second length greater than the first length, and so on. This permits spacing of the respective inlets 122 and chambers 124 along the length of the shaft 118 to maintain separation of the discrete fluid pathways between the pneumatic pathway 116 and the shaft 118.

A plurality of seals 126 are provided along the axis of the shaft 118, each of the seals 126 segregating the plurality of discrete fluid pathways between the shaft 118 and the pneumatic pathways 116 (i.e. the seals 126 are spaced along the axis between each of the inlets 122).

The shaft 118 may comprise one or more connection features to provide a connection between the gripping assembly 1 and the shaft 118, e.g. to provide mechanical keying of the gripping assembly 1 and the shaft 118. For example, the shaft 118 comprises a threaded hole 128 configured to receive the threaded bolt 130 (see FIG. 10B) on the gripping assembly 1. Alternatively, a non-circular, e.g. elliptical or polygonal, profile of the shaft 118 and/or gripping assembly 1 could be used to this end. Thus, the gripping assembly 1 can be rotationally keyed to the distal end of the shaft 118, whilst permitting attachment and removal, e.g. in an axial direction, for cleaning/replacement.

As shown most clearly in FIG. 13, the shaft 118 comprises a plurality of outlet cavities 130 at an end thereof configured to accommodate the respective pneumatic connectors 76 on end gripping assembly 1. Each of the pneumatic lines 104/pathways 116 are operatively connected to the each of the respective. Therefore, the carriage 92 supplies the gripping assembly 1 with pneumatic fluid to actuate the forward and return stroke of the piston 40 independently.

The connection member 70 provides an adapter for connecting the gripping assembly 1 to the end effector carriage 92. The connection member 70 therefore provide a pass-through of the pneumatic lines to gripping assembly 1. This allows connection of the dual pneumatic connector 76 of the assembly in FIGS. 2-9 to the quad pneumatic connector arrangement of the carriage 92 of FIG. 12. The arrangement thus provides a modular and universal system, and the carriage 92 may be used for a variety of purposes. Fewer pneumatic pathways and/or connectors could be provided on the shaft 118 if desired, e.g. to match the number of connectors 76 for the gripper.

FIGS. 1 and 14-19 show the deformation of the gripper 2 as the first arms 52 move toward the second arms 56.

In FIG. 1, the piston 40 is provided at a position distal the second arms 56. The first and second arms (and respective first 14 and second 24 connection members) are therefore at a maximum separation. The gripper 2 is undeformed.

Figure 14:
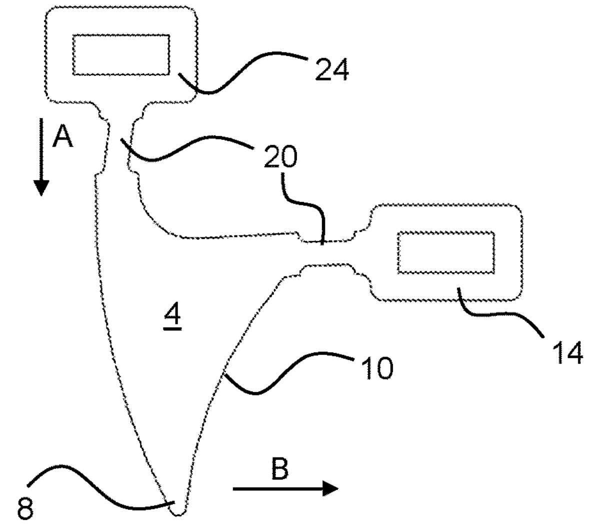
Figure 15:
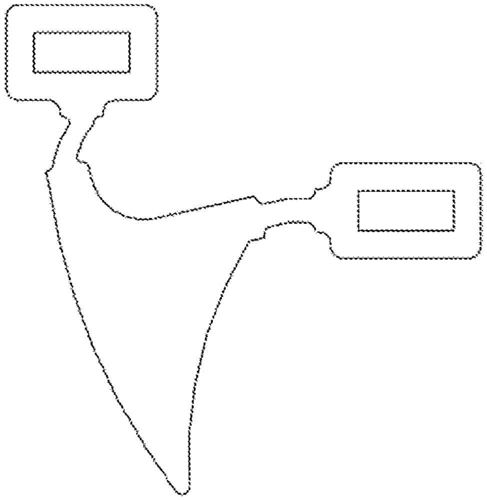
Figure 16:
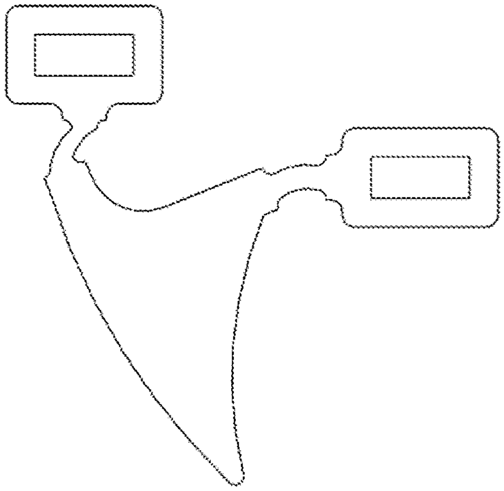
Figure 17:
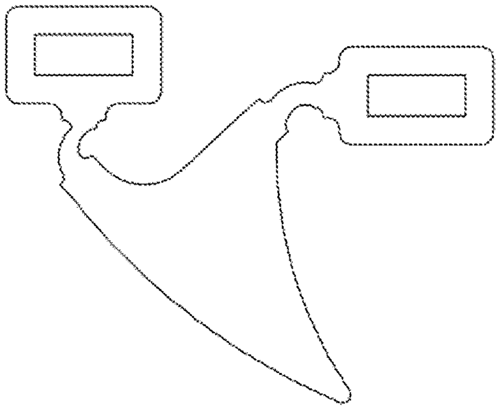

In FIG. 14, the piston 40 drives the first arms 52 toward the second arms 56, i.e. in the direction of linear actuation shown by arrow A. The hinges 20 begin to deform and the apex 8/first side 10 moves toward the product (i.e. in a lateral/tangential direction shown by arrow B).

Figure 18:
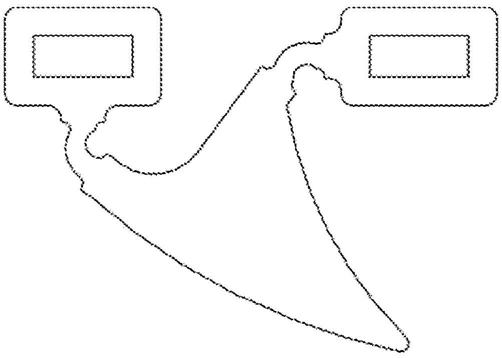

Deformation continues to occur through FIGS. 15-19, until the pneumatic actuator 38 has moved the full length of the desired actuation. The first and second arms may be proximal one another in a fully actuated condition. In FIG. 18, the retaining member 16 of the first connection member 14 is level with the connection member 16 of the second connection member 24.

Figure 19:
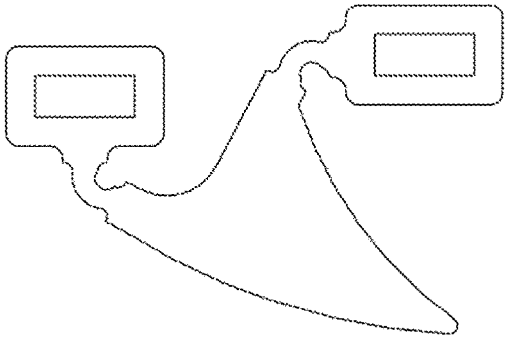

As shown in FIG. 19, the first arms 52 may continue further toward the second arms 56, such that the retaining member 16 of the first connection member 14 is axially above the connection member 16 of the second connection member 24, i.e. the connection member 24 is actuated beyond the axial height/position of the connection member 14.

During actuation, the apex 8 has rotated toward the product. The apex 8 now engages the product. The body 4 is also translated (i.e. the body 4 has not merely rotated on the spot). The body 4 has been translated/rotated laterally inwards toward the product and may have an axial component upwards toward the hub 34. The axis of rotation of the gripper 2 is located about the hinge 20 of the first connection portion 14. The axis of rotation may be outside of the body 4. The gripper 2 thus undergoes a swinging action. The gripper 2 may therefore bring the product upwards toward the hub 34 (e.g. away from a conveyor on which the product may be carried to the gripper mechanism).

Movement of the body 4 is accommodated by the first and second connection portions (i.e. the hinges thereof). The connections portions are flexible (i.e. by nature of the wall thickness thereof) and the body is substantially more resilient/rigid. The body 4 therefore remains substantially undeformed during actuation. The grippers 2 convert a linear translation of the pneumatic actuator 38 into a rotational movement.

In some embodiments, the grippers 2 are arrangement are arranged to extend outwardly during actuation to grip the inside of the product (e.g. for a pipe or cup shaped product). For example, the apex 8 may face an outward direction.

In some embodiments, the gripper 2 may be manufactured in the engaged position (e.g. as shown in FIG. 19). Movement of the actuator may therefore deform the gripper 2 such that it is in a position away from the product (i.e. the reverse process shown in FIG. 14-19). This would then provide a resilient bias toward engagement of the product by the deformation of the gripper. This bias may provide the return stoke of the actuator.

The present gripper provides a "soft" or conformal gripper, thus allow gripping a soft or delicate product. Actuation of the plurality of grippers can be provided by a single linear actuator, thus allowing for a simple and cost-effective design. The level of loading for engagement/disengagement with the product may be tailored to each usage application.

The single unitary design of the gripper allows the gripper to manufactured using an extrusion or simple sheet material cutting process. This process is quick, cost effective, and does not require the use of complex hinges etc, thus increasing mechanical reliability. Additionally, the grippers can be formed in a semi-continuous fashion and individual grippers can be cut to size according to the end user's needs. For example, the end user may purchase a length of extrusion and then cut sizes of the gripper as is required, without the need for bespoke moulding. This significantly reduces the unit cost of each gripper. The solid body of the gripper provides a predictable gripper force and is not prone to punctures or other damage. The grippers are easily removed from gripping mechanism, thereby allowing convenient replacement.

The gripper comprises a smooth and/or relatively flat surface, reducing the build-up of contaminants etc. The pneumatic actuator is contained within the hub 34 and is therefore not exposed to external environment. The present device is therefore hygienic and may provide a reduced cleaning burden. The ability to convert a pneumatic drive into a soft, pivoting gripping action is particularly beneficial for maintaining the hygienic nature of the system, i.e. with pneumatic lines being sealed and easy to clean. This is in contrast to exposed mechanisms or lubricated/hydraulic mechanisms that can risk liquid contamination into the clean working environment.

The gripping mechanism is modular in nature. Therefore, the mechanism is conveniently removed/replaced as a whole unit or disassembled, and parts may be replaced or substituted with ease.

The gripping mechanism can also be used to consolidate/align a product, or combination of components. For example, when used to grip a sandwich, the action of the grippers will serve to align one or more offset slice of bread into the predetermined orientation defined by the array of grippers. This aligning function is important in a number of scenarios, for example in readiness for downstream operation, such as packing, cutting, or the like.

In further developments of the above described embodiments, the gripper members may be provided with internal member of a different material to the remainder of the gripper member. The internal member may provide additional strength or support to the gripper member, e.g. in the form of a spine. A spring member, e.g. a plastic or metallic coil spring or leaf spring, may be embedded in the gripper members. In this way, the gripper member material (e.g. elastomer) may be softer and the additional strength of the gripper member may be accommodated by the internal member. The internal member may promote a desired deformation behaviour of the gripper member. Thus a particularly soft touch of the gripper member may achieved without jeopardising the desired deformation behaviour.

In further developments, there is shown a gripper member in FIGS. 20A and 20B. The gripper member has an integral thumb formation such that deformation of the gripper member in use occurs between the gripper member and its thumb, e.g. akin to a pinching action. The thumb formation may be more rounded at its distal end than the distal end/tip of the gripper member. The thumb formation may have a roughened distal end or small protrusions/ridges in the vicinity of the distal end and/or against which the distal end of the gripper member engages in use.

In the example of FIG. 20, the gripper member and its thumb may be connected by a hinge/tie/bridge formation. Either or both of the gripper member and its opposing thumb may deform upon actuation, e.g. towards the other. In the example shown, the thumb depends from the connection formation 14 described above, e.g. being integral therewith. Another feature shown in FIG. 20B concerns a modified distal end of the gripper member. In this example, the distal end is tapered outwardly in a width direction to provide a wider grip formation at its tip. The wider grip formation provides a larger gripping area. This wider grip formation may be applied to any of the embodiments of the gripper member described herein, i.e. with or without the presence of the thumb member.

Numerous applications for the gripper described herein have been found. As well a picking, lifting, reorienting or otherwise manipulating delicate members, the gripper may be used to perform controlled deformation actions. For example in the sphere of food production, the gripper may be used to perform crimping of pastry or consolidating of loose or deformable materials.

The invention claimed is:

1. A gripper assembly for gripping a product, comprising:
- first and second mounting members;
- an actuator for causing relative movement between the first and second mounting members; and
- a plurality of gripper members spaced apart about a primary axis, wherein at least one of the gripper members comprises a resiliently deformable body comprising a distal end and first and second connection formations spaced from the distal end and laterally spaced from each other, the first and second connection formations being connected to the first and second mounting members respectively such that an axial component of movement between the first and second mounting members caused by the actuator in use imparts a rotation of the distal end of each gripper member in a direction towards and/or away from the primary axis;
- wherein one of the first or second connection formations is attached to the resiliently deformable body by a bridge formation of reduced width, and the bridge formation extends in the lateral direction.

2. The gripper assembly according to claim 1, wherein the distal end comprises an apex in plan.

3. The gripper assembly according to claim 1, wherein the body comprises a curved/arcuate side wall facing the primary axis.

4. The gripper assembly according to claim 1, wherein each gripper member comprises a resiliently deformable claw formation.

5. The gripper assembly according to claim 1, wherein the resiliently deformable body is substantially triangular, the first and second connection formations being provided at respective corners of the body.

6. The gripper assembly according to claim 1, wherein the first and second connection formations depend from the body in substantially perpendicular directions with respect to one another.

7. The gripper assembly according to claim 1, wherein the first and/or second connection formations comprise a hinge.

8. The gripper assembly according to claim 1, wherein the gripper member is provided as a moulded, continuous body comprising the resiliently deformable body and the first and second connection formations.

9. The gripper assembly according to claim 1, wherein the first and/or second connection formations are integrally formed with the resiliently deformable body.

10. The gripper assembly according to claim 1, wherein relative movement of the first and second connection portions imparts a translation on the body.

11. The gripper assembly according to claim 1, wherein the first and/or second connection formation comprises a loop.

12. The gripper assembly according to claim 1, wherein the first and second mounting members each comprise a corresponding connection formation for receiving the respective connection formation of each gripper member.

13. The gripper assembly according to claim 12, wherein the connection formations and/or corresponding connection formations are shaped to prevent rotation there-between.

14. The gripper assembly according to claim 1, wherein the gripper member is uniform in cross-section in at least one direction.

15. The gripper assembly according to claim 1, wherein the gripper distal end comprises a widened gripper end in a lateral direction relative to its direction of actuation.

16. The gripper assembly according to claim 1, wherein three or more gripper members are provided about the primary axis, each gripper member being arranged to rotate about an axis of rotation that is tangential to the primary axis and/or aligned with an edge of a polygon oriented about the primary axis when viewed in the direction of the primary axis.

17. The gripper assembly according to claim 1, wherein two or more gripper members share a common axis of rotation.

18. The gripper assembly according to claim 1, wherein the actuator comprises a linear pneumatic actuator.

19. The gripper assembly according to claim 18, further comprising a hub, the linear pneumatic actuator being provided within the hub.

20. The gripper assembly according to claim 1, wherein the first and/or second mounting members comprise a plurality of arms configured to engage a respective gripper.

21. The gripper assembly according to claim 1, wherein the first and/or second mounting members depend radially outwardly from the primary axis.

22. The gripper assembly according to claim 1, further comprising a robotic armature, wherein the actuator, mounting members and gripper members are mounted to the robotic armature.

23. The gripper assembly according to claim 22, wherein the gripper assembly is rotatable relative to the robotic armature.

24. A gripper member for use in a gripper assembly, the gripper member comprising a resiliently deformable body comprising:

a distal end; and first and second connection formations spaced from the distal end and laterally spaced from each other, the first and second connection formations being arranged to be connected to first and second mounting members of an actuation mechanism, wherein an axial component of movement between the first and second connection formations imparts a rotation of the distal end of the gripper member relative to the axis; wherein the first and/or second connection formation is attached to the resiliently deformable body by a bridge formation of reduced width, and the bridge formation extends in the lateral direction.

25. The gripper member according to claim 24, provided as a moulded, unitary, continuous and/or solid body comprising the connection formations.

* * * * *